United States Patent
Kim et al.

(10) Patent No.: US 8,899,392 B2
(45) Date of Patent: Dec. 2, 2014

(54) DAMPER FOR DECREASING A PIPE VIBRATION

(71) Applicant: Samsung Electronics Co., Ltd., Suwon (KR)

(72) Inventors: Mun Sub Kim, Suwon (KR); Hyun Wuk Kang, Suwon (KR); Jin Yong Mo, Anyang (KR); Yong Jae Song, Seoul (KR); Cheon Seok Yoon, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 116 days.

(21) Appl. No.: 13/658,313

(22) Filed: Oct. 23, 2012

(65) Prior Publication Data
US 2013/0112518 A1   May 9, 2013

(30) Foreign Application Priority Data

Nov. 3, 2011   (KR) ........................ 10-2011-0113656

(51) Int. Cl.
| | | |
|---|---|---|
| F16F 7/10 | (2006.01) | |
| F24F 13/02 | (2006.01) | |
| F16L 55/033 | (2006.01) | |
| F24F 13/24 | (2006.01) | |
| F16F 7/108 | (2006.01) | |

(52) U.S. Cl.
CPC ............... *F16F 7/108* (2013.01); *F24F 13/02* (2013.01); *F16L 55/0336* (2013.01); *F24F 13/24* (2013.01)
USPC ............................ 188/379; 188/378; 267/141

(58) Field of Classification Search
CPC ....... F16F 7/108; F16F 15/12; F16F 15/1202; F16F 15/126; F16F 7/104; F16L 55/0336
USPC .............. 188/378, 379; 267/292–294, 140.3, 267/140.4, 141, 141.1
See application file for complete search history.

(56) References Cited

U.S. PATENT DOCUMENTS

| | | | | |
|---|---|---|---|---|
| 3,419,111 A | * | 12/1968 | Jones et al. .................... | 188/379 |
| 4,043,432 A | * | 8/1977 | Scheldorf ...................... | 188/379 |
| 4,223,565 A | * | 9/1980 | Sugiyama et al. ............. | 464/180 |
| 4,943,263 A | * | 7/1990 | Zyogahara et al. ............ | 464/180 |
| 5,056,763 A | * | 10/1991 | Hamada et al. ................ | 267/141 |
| 5,660,256 A | * | 8/1997 | Gallmeyer et al. ............ | 188/379 |

(Continued)

FOREIGN PATENT DOCUMENTS

| KR | 2000-0010143 | 6/2000 |
|---|---|---|
| KR | 20-0303233 | 2/2003 |
| KR | 10-2007-0040116 | 4/2007 |

*Primary Examiner* — Thomas Irvin
(74) *Attorney, Agent, or Firm* — Staas & Halsey LLP

(57) ABSTRACT

A damper for decreasing a piping vibration capable of enhancing the efficiency in decreasing the piping vibration and adjusting the weight of a weight portion according to the type of the compressor and the shape of the pipe applied to the compressor by separating a fixed portion from a weight portion such that the fixed portion makes a direct contact with a pipe and the weight portion has an interval from the pipe without making a direct contact with the pipe, in which the damper installed on the pipe to decrease the vibration includes a fixation part provided with a coupling hole formed therein to be coupled to the pipe, and coupled and fixed to the pipe such that the coupling hole makes contact with an outer circumferential surface of the pipe, and a weight part connected to the fixation part.

7 Claims, 8 Drawing Sheets

(56) References Cited

U.S. PATENT DOCUMENTS

| | | | |
|---|---|---|---|
| 5,884,902 A * | 3/1999 | Hamada et al. | 267/141 |
| 6,412,586 B1 * | 7/2002 | Askew | 180/309 |
| 6,485,370 B1 * | 11/2002 | Kurosu et al. | 464/180 |
| 6,857,623 B2 * | 2/2005 | Kuwayama | 267/141.3 |
| 6,981,579 B2 * | 1/2006 | Kuwayama et al. | 188/379 |
| 7,946,925 B2 * | 5/2011 | Kawakatsu et al. | 464/180 |
| 8,701,848 B2 * | 4/2014 | Tesner et al. | 188/379 |
| 2004/0149532 A1 * | 8/2004 | Beigang | 188/379 |
| 2008/0023899 A1 * | 1/2008 | Hasegawa et al. | 267/141.1 |
| 2012/0247896 A1 * | 10/2012 | Tesner et al. | 188/378 |

* cited by examiner

DAMPER FOR DECREASING A PIPE VIBRATION

CROSS-REFERENCE TO RELATED APPLICATIONS

This application claims the benefit of Korean Patent Application No. 2011-0113656, filed on Nov. 3, 2011 in the Korean Intellectual Property Office, the disclosure of which is incorporated herein by reference.

BACKGROUND

1. Field

Embodiments of the present disclosure relate to a damper for decreasing a piping vibration to decrease the vibration of a pipe.

2. Description of the Related Art

In general, an air conditioner includes a compressor to compress refrigerant gas at high temperature and high pressure; a condenser configured to radiate heat from the high-temperature and high-pressure refrigerant gas transported from the compressor and also configured to gradually phase-change the high-temperature and high-pressure refrigerant gas to a liquid state; an outdoor part having a capillary pipe to pressurize the refrigerant into a low-temperature liquid state and a gas state as the refrigerant is transported from the condenser after being phase-changed into a liquid state; an indoor part having an evaporator configured to maintain an indoor at a low temperature by taking away the heat of the indoor as the evaporator passes through and evaporates the refrigerant that is provided in the low-temperature liquid state and in the gas state and transported from the capillary pipe, and at the same time, configured to transport the evaporated refrigerant gas to the compressor again; and a connecting pipe part to connect the indoor part and the outdoor part.

In a case of a household air conditioner and an industrial air conditioner, the household air conditioner and the industrial air conditioner includes a cycle in which refrigerant circulates by using a copper pipe from the compressor to the condenser, from the condenser to the evaporator, and then from the evaporator to the compressor.

The pipe connected with the compressor is directly subjected to vibration during the operation of the compressor, and a crack may be generated in the pipe when the piping vibration is generated on a large scale.

In such a situation, a weight material is added to decrease the piping vibration.

By adding a weight material to a particular position of the entire pipe, the natural frequency of the pipe is moved to a lower frequency band while avoiding the operating frequency of the compressor, thereby decreasing the piping vibration.

In a conventional method of adding a weight material, the pipe and the weight material made of rubber are integrally fixed to each other by a fixation clip or a cable tie.

In the case of the structure above, however, although the natural frequency of the pipe line is moved to a lower frequency band, the effect in decreasing the vibration is not large.

Thus, in a case of a pipe applied to a constant speed compressor operated at a constant speed, only a predetermined frequency range is needed to be avoided, thereby having an improvement in the vibration with the structure as the above.

However, if a weight material having the structure as the above is applied to a pipe applied to an inverter compressor that is operated in a considerably wide frequency range, the frequency is moved but the decrease of the vibration does not take place, thereby a difficulty occurs within the range of the operating range of frequency.

SUMMARY

Therefore, it is an aspect of the present disclosure to provide a damper for decreasing a piping vibration configured to enhance the efficiency in decreasing the piping vibration, by separating a fixed portion from a weight portion such that the fixed portion makes a direct contact with a pipe and the weight portion has an interval from the pipe without making a direct contact with the pipe.

In addition, it is another aspect of the present disclosure to provide a damper for decreasing a piping vibration configured to adjust the weight of a weight part according to the type of a compressor and the shape of a pipe applied to the compressor.

Additional aspects of the disclosure will be set forth in portion in the description which follows and, in portion, will be apparent from the description, or may be learned by practice of the disclosure.

In accordance with one aspect of the present disclosure, a damper for decreasing a piping vibration while being installed at a pipe to decrease a vibration includes a fixation part, a weight portion and a slitting part. The fixation portion may be provided with a coupling hole formed therein to be coupled to the pipe, and coupled and fixed to the pipe such that the coupling hole makes contact with an outer circumferential surface of the pipe. The weight portion may be connected to the fixation part, and provided at an inside thereof with a penetrating hole having a diameter larger than an outside diameter of the pipe formed thereto such that the pipe passes through the penetrating hole while the weight portion is spaced apart from the outer circumferential surface of the pipe. The slitting portion may be formed in a slitting manner from one of the sides of the outer circumferential surfaces of the fixation portion and the weight portion to the coupling hole and the penetrating hole lengthways of the fixation portion and the weight part.

The fixation portion may include material provided in a cylindrical shape while having elasticity.

A spring clip may be coupled to the fixation portion to fix the fixation portion to the pipe.

The spring clip may include steel material having elasticity.

The spring clip may be in a circular shape having one side thereof open, such that the spring clip is inserted around the fixation portion to surround the outer circumferential surface of the fixation part, and thereby the fixation part is fixed to the pipe.

A coupling groove may be formed along a circumference of the fixation portion at the outer circumferential surface of the fixation portion such that the spring clip is coupled to the coupling groove.

The weight portion may include material provided in a cylindrical shape while having elasticity.

A plurality of insertion grooves are formed at the weight part, and a weight of the weight portion is controlled by inserting a weight controlling member into the insertion groove.

The weight portion may include a plurality of weight controlling portions provided with the insertion groove formed thereto, and the insertion groove is formed in a predetermined number corresponding to the number of the weight controlling portions.

The fixation portion and the weight portion may be fixed to the pipe through the slitting part, which is formed at the outer circumferential surface of the fixation portion and the weight part, while surrounding the pipe.

In accordance with another aspect of the present disclosure, a damper for decreasing a piping vibration installed at a pipe to decrease a vibration includes a fixation portion, a weight portion and a slitting portion. The fixation portion may be provided with a coupling hole formed therein to be coupled to the pipe, and coupled and fixed to the pipe such that the coupling hole makes contact with an outer circumferential surface of the pipe. The weight portion may be connected to the fixation part, and provided at an inside thereof with a penetrating hole allowing the pipe to pass therethrough and having a diameter larger than a diameter of the coupling hole. The slitting portion may be formed in a slitting manner from one of the sides of the outer circumferential surfaces of the fixation portion and the weight portion to the coupling hole and the penetrating hole lengthways of the fixation portion and the weight part. The diameter of the penetrating hole of the weight portion is larger than an outside diameter of the pipe, such that a space is formed in between the penetrating hole and the outer circumferential surface of the pipe.

The fixation portion may include material provided in a cylindrical shape while having elasticity.

A spring clip may be coupled to the fixation portion to fix the fixation portion to the pipe.

The spring clip may include steel material having elasticity.

The spring clip may be formed in a circular shape having one side thereof open, such that the spring clip is inserted around the fixation portion to surround the outer circumferential surface of the fixation part, and thereby the fixation portion is fixed to the pipe.

A coupling groove may be formed along a circumference of the fixation portion at the outer circumferential surface of the fixation portion such that the spring clip is coupled to the coupling groove.

The weight portion may include material provided in a cylindrical shape while having elasticity.

A plurality of insertion grooves may be formed at the weight part, and a weight of the weight portion is controlled by inserting a weight controlling member into the insertion groove.

The weight portion may include a plurality of weight controlling portions provided with the insertion groove formed thereto, and the insertion groove may be provided in a predetermined number corresponding to the number of the weight controlling portions.

The fixation portion and the weight portion may be fixed to the pipe through the slitting part, which is formed at the outer circumferential surface of the fixation portion and the weight part, while surrounding the pipe.

As described above, by decreasing the vibration of a pipe, a crack may be prevented from occurring on the pipe.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
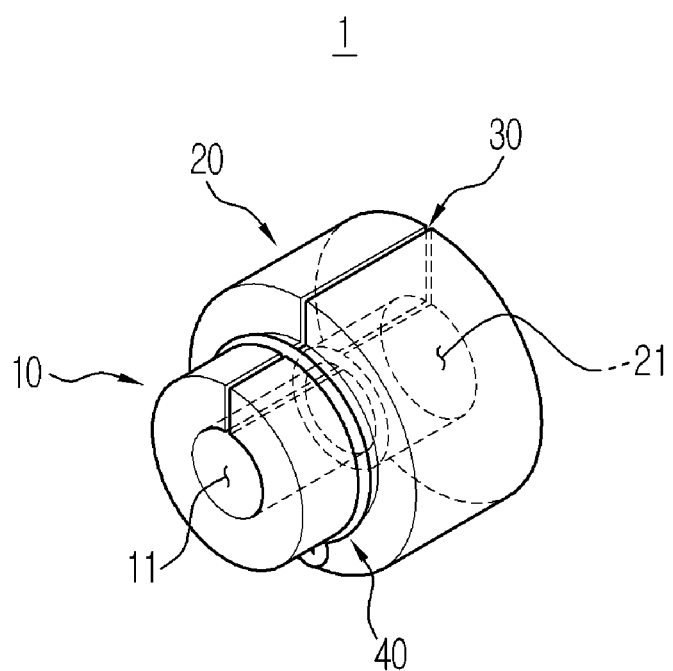
FIG. 1 is a perspective view illustrating a damper for decreasing a piping vibration in accordance with one embodiment of the present disclosure.
Figure 2:
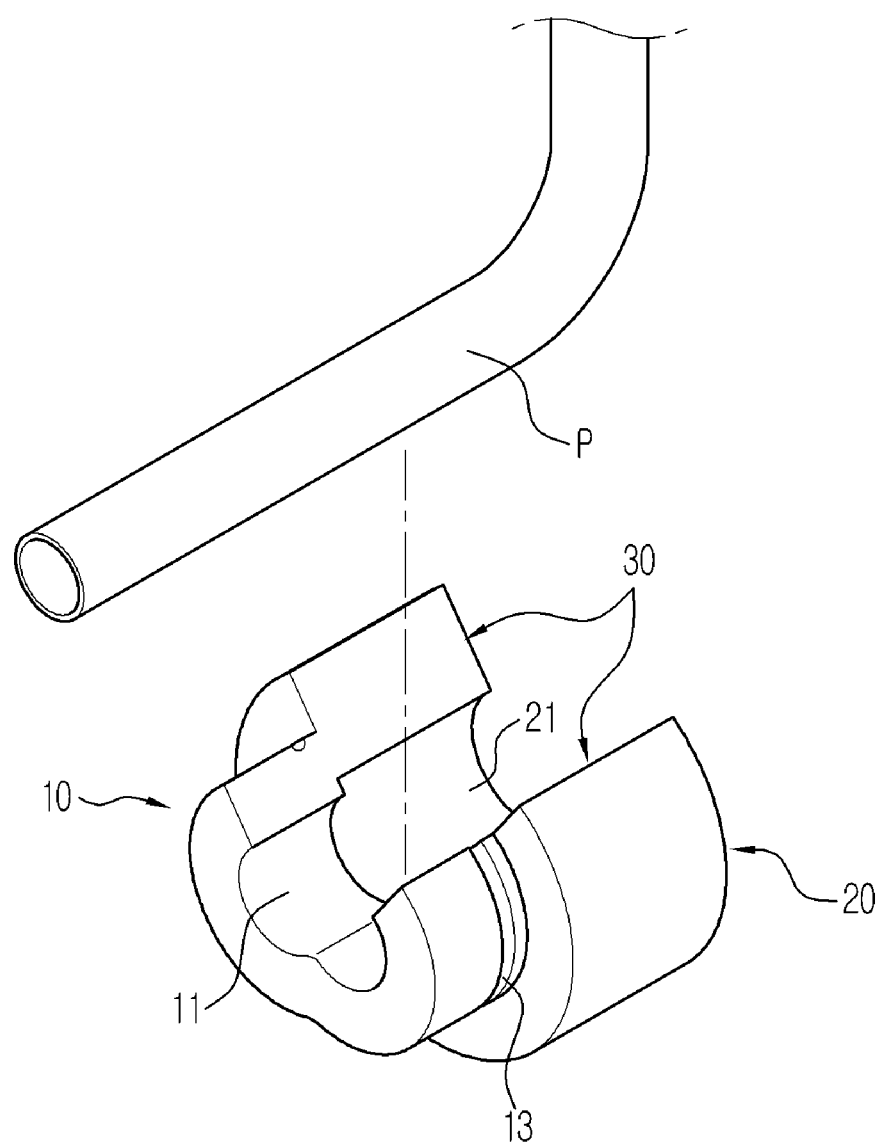
FIG. 2 is a drawing showing a damper for decreasing a piping vibration being installed at a pipe in accordance with one embodiment of the present disclosure.
Figure 3:
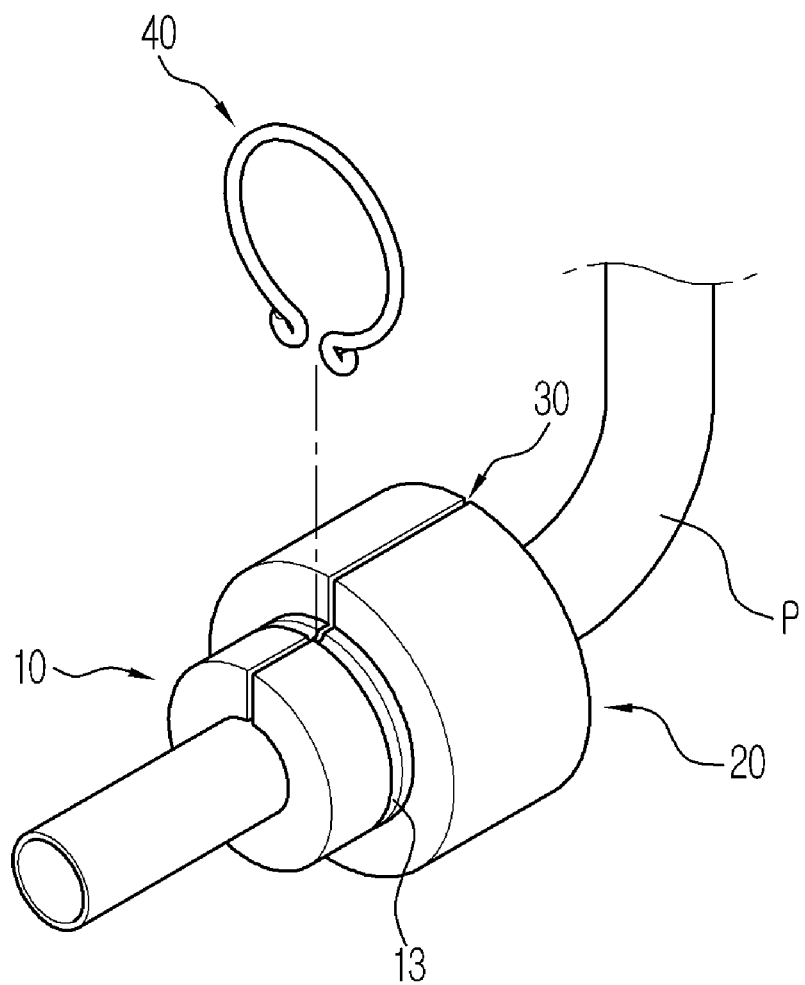
FIG. 3 is a drawing showing a damper for decreasing a piping vibration being fixed to a pipe by a spring clip in accordance with one embodiment of the present disclosure.
Figure 4:
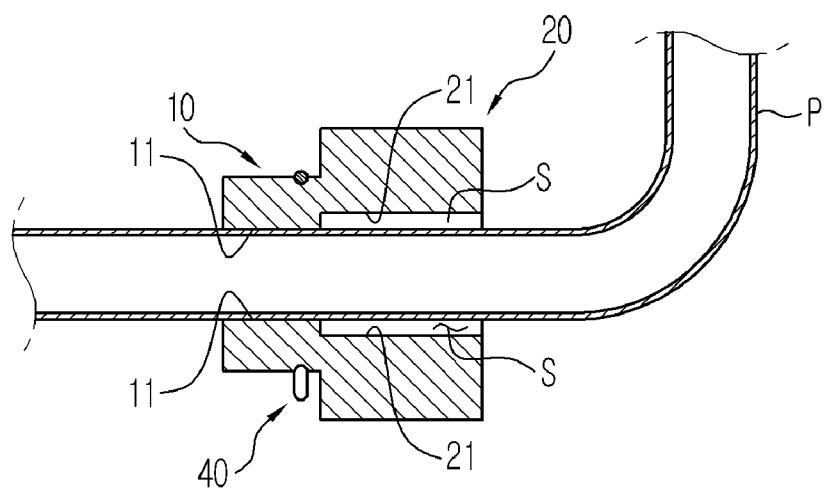
FIG. 4 is a cross-sectional view showing a damper for decreasing a piping vibration installed at a pipe in accordance with one embodiment of the present disclosure.

Reference will now be made in detail to the embodiments of the present disclosure, examples of which are illustrated in the accompanying drawings, wherein like reference numerals refer to like elements throughout.

As illustrated in FIGS. 1 to 4, a damper 1 for decreasing a piping vibration includes a fixation part 10 fixed to a pipe P while directly making contact with the pipe P, a weight part 20 connected to the fixation part 10 and formed in a way that a space S is present in between the weight part 20 and the pipe P while not directly making contact with the pipe P, and a slitting part 30 formed in a slitting manner at the outer circumferential surface of the fixation part 10 and the weight part 20 in lengthways of the fixation part 10 and the weight part 20.

The damper 1 is installed at the pipe P, which is configured to the structure of the refrigerant cycle of an air conditioner or a refrigerator, and decreases the vibration of the pipe P.

The damper 1 is structured to be separated into the fixation part 10 and the weight part 20, and the fixation part 10 is fixed to the pipe P by directly making contact with the pipe P, and the weight part 20 is connected to the fixation part 10 while formed in a way that the space S is present in between the weight part 20 and the pipe P without directly making contact with the pipe P.

The fixation part 10 is formed with the material in a cylindrical shape while having elasticity, and for example, the fixation part 10 may be formed with rubber.

In the drawings, it is illustrated that the fixation part 10 is provided with a cylindrical shape, but the shape of the fixation part 10 may be variously formed.

A coupling hole 11 having the same diameter as the diameter of the pipe P is formed at an inside of the fixation part 10, such that the pipe P is fixed to the pipe P by directly making contact at the fixation part 10.

In order to install the damper 1 at the pipe P, after the slitting part 30 formed at the fixation part 10 and the weight part 20 is spread open, the damper 1 is inserted around the pipe P through the slitting part 30, which is spread open, such that the damper 1 is installed at the pipe P.

At this time, the fixation part 10 is fixed to the pipe P in a state that the coupling hole 11 formed at an inside the fixation part 10 is directly making contact at the outer circumferential surface of the pipe P.

In order to fix the fixation part 10 to the pipe P, a spring clip 40 is coupled to the fixation part 10.

In order to couple the spring clip 40, a coupling groove 13 is formed at the outer circumferential surface of the fixation part 10 along the circumference of the fixation part 10, and by fastening and tightening the spring clip 40 at the coupling groove 13, the fixation part 10 is fixed to the pipe P.

The spring clip 40 configured to fix the fixation part 10 to the pipe P is formed with a steel material having elasticity, and the spring clip 40 is formed in a circular shape having one side thereof open, such that the spring clip 40 is inserted around the fixation part 10 to surround the outer circumferential surface of the fixation part 10, and thereby the fixation part 10 is fixed to the pipe P.

After having the open one side of the spring clip 40 spread open, and then having the spring clip 40 inserted around and tightened to the coupling groove 13 of the fixation part 10, the fixation part 10 is fixed to the pipe P.

The weight part 20, as similar to the fixation part 10, is formed with the material in a cylindrical shape while having elasticity, and for example, the weight part 20 may be formed with rubber.

The weight part 20, which takes about 80% of the overall weight of the damper 1, is connected to the fixation part 10, and is formed to have a larger outside diameter than the outside diameter of the fixation part 10.

A penetrating hole 21 having a larger diameter than the diameter of the coupling hole 11 formed at the fixation portion 10 and the diameter of the pipe P is formed at an inside the weight part 20.

In order to install the damper 1 at the pipe P, after the slitting part 30 formed at the fixation part 10 and the weight part 20 is spread open, the damper 1 is inserted around the pipe P through the slitting part 30, which is spread open, such that the damper 1 is installed at the pipe P.

Since the penetrating hole 21 formed at an inside the weight part 20 is formed to have a large diameter than the outside diameter of the pipe P, the penetrating hole 21 is not directly making contact with the outer circumference of the pipe P, and the space S is present in between the penetrating hole 21 and the outer circumferential surface of the pipe P.

Since the weight part 20 is not directly making contact with the pipe P, and is formed in a way to have the space S in between the weight part 20 and the pipe P, the weight part 20 may be able to move freely compared to the fixation part 10 that is being in contact with the pipe P.

By having the weight part 20 structured to move freely, the effect in decreasing the vibration of the pipe P may be improved.

Figure 5:
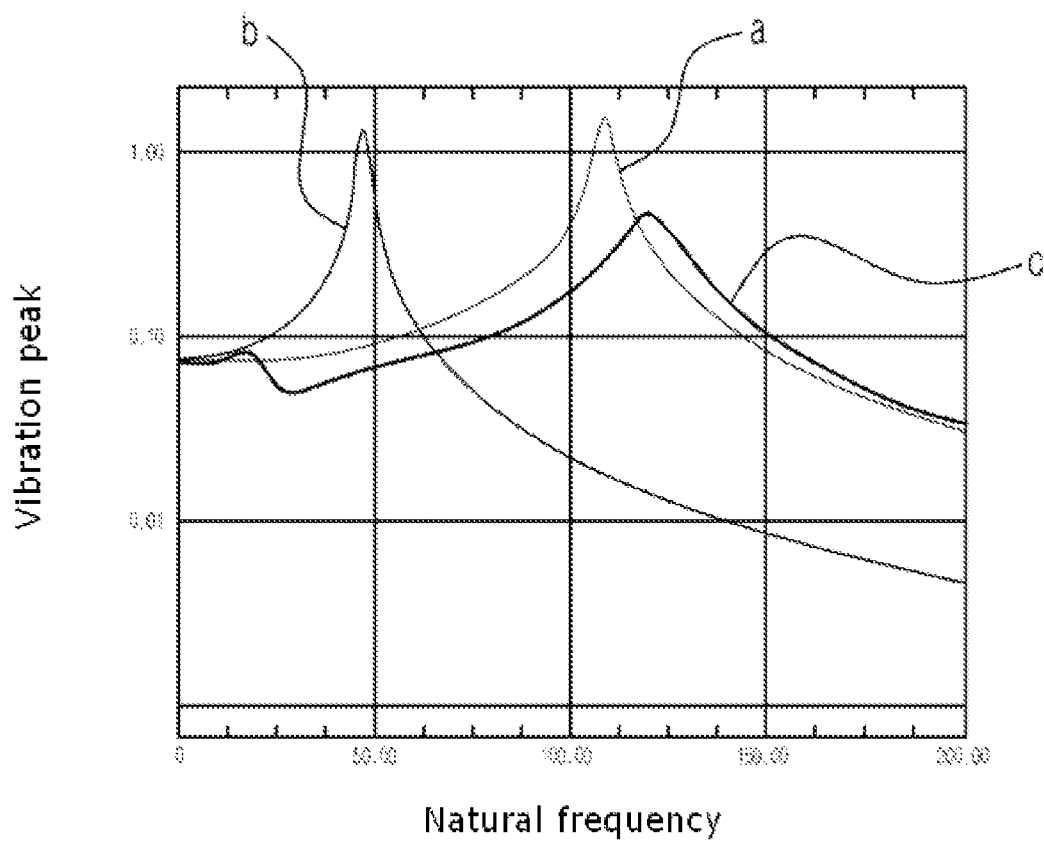
FIG. 5 is a drawing illustrating the changes of the natural frequency and the vibration peak on a graph in a case when a damper for decreasing a piping vibration is installed at a pipe in accordance with one embodiment of the present disclosure.

Referring to FIG. 5, a comparison will be made among the case (a) when the damper 1 is not installed at the pipe P; the case (b) when a damper for decreasing a piping vibration 1 formed as a unitary body without being separated between the fixation portion 10 and the weight portion 20, is configured to make contact with the pipe P as a whole; and the case (c) when the damper 1 for decreasing a piping vibration formed to be separated into the fixation 10 and the weight portion 20 is configured such that the fixation portion 10 makes contact with the pipe P without allowing the weight part 20 to make contact with the pipe P.

In the case (b) when the damper having the fixation portion 10 and the weight portion 20 formed as an unitary body without being separated between the fixation portion 10 and the weight portion 20 makes contact with the pipe P, the natural frequency at the case (b) is moved to a lower frequency range to the case (a) when the damper for decreasing a piping vibration 1 is not installed at the pipe P.

Accordingly, the natural frequency of the pipe P is moved to a lower frequency band to avoid the driving frequency of the compressor, and thereby the vibration of the pipe P may be improved.

However, since the vibration peak shows almost no change, in a case of the pipe P connected to a constant speed compressor that is being operated at a constant speed, the vibration of the pipe P may be improved. However, in a case of the pipe P connected to an inverter compressor that is being operated in a considerably large range, only the frequency is moved without the vibration being decreased, and thus the effect in decreasing the vibration of the pipe P is not large.

In the case (c) when the damper for decreasing a piping vibration 1 formed to be separated into the fixation portion 10 and the weight portion 20 such that the fixation portion 10 makes contact with the pipe P without allowing the weight portion 20 to make contact with the pipe P, the vibration peak at the case (c) is largely decreased compared to the case (b).

Thus, even in a case of the pipe P connected to the inverter compressor that is being operated in a considerably large frequency range, the effect in decreasing the vibration of the pipe P becomes large.

The damper for decreasing a piping vibration 1 configured to decrease the vibration of the pipe P, to improve the effect in decreasing a vibration, is formed to have a different weight each according to the type of a compressor or the shape of the pipe P that is connected to a compressor.

Figure 6:
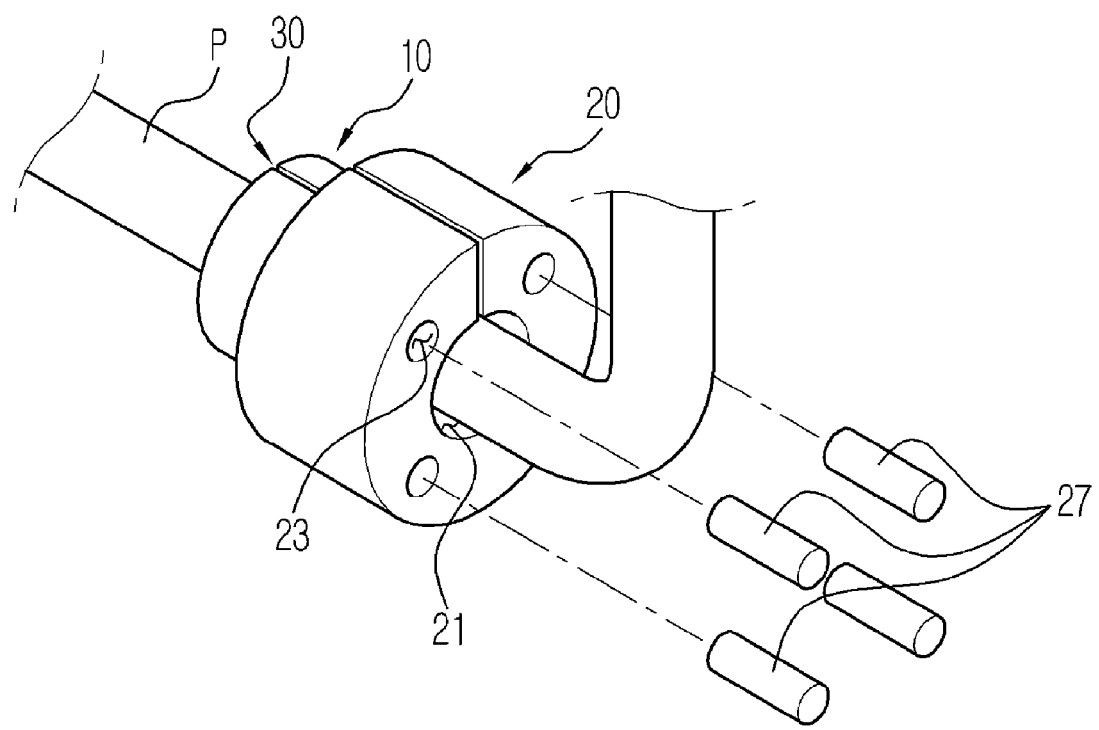
FIG. 6 is a drawing showing an insertion groove formed at a weight part of a damper for decreasing a piping vibration, and a weight controlling member is inserted into the insertion groove in accordance with one embodiment of the present disclosure.

As illustrated on FIG. 6, a plurality of insertion grooves 23 may be formed at the weight portion 20, and as a weight controlling member 27 is inserted into the insertion groove 23, the weight of the weight part 20 is controlled.

In a case when the weight of the damper for decreasing a piping vibration 1 is needed to be controlled after installing the damper for decreasing a piping vibration 1 at the pipe P, the weight controlling member 27 is inserted into the insertion groove 23, so that the weight of the damper for decreasing a piping vibration 1 is controlled.

By inserting the weight controlling member 27 into some of the insertion holes among the plurality of the insertion grooves 23 formed at the weight part 20, the weight of the damper for decreasing a piping vibration 1 may be controlled, and by inserting the weight controlling member 27 into all of the insertion holes among the plurality of the insertion grooves 23 formed at the weight part 20, the weight of the damper for decreasing a piping vibration 1 may be controlled.

The number of the insertion grooves 23 formed in the weight portion 20 is not limited thereto, and may be provided in a predetermined number depending on the depth and the diameter of the insertion groove 23 and the material of the weight controlling member 27.

Figure 7:
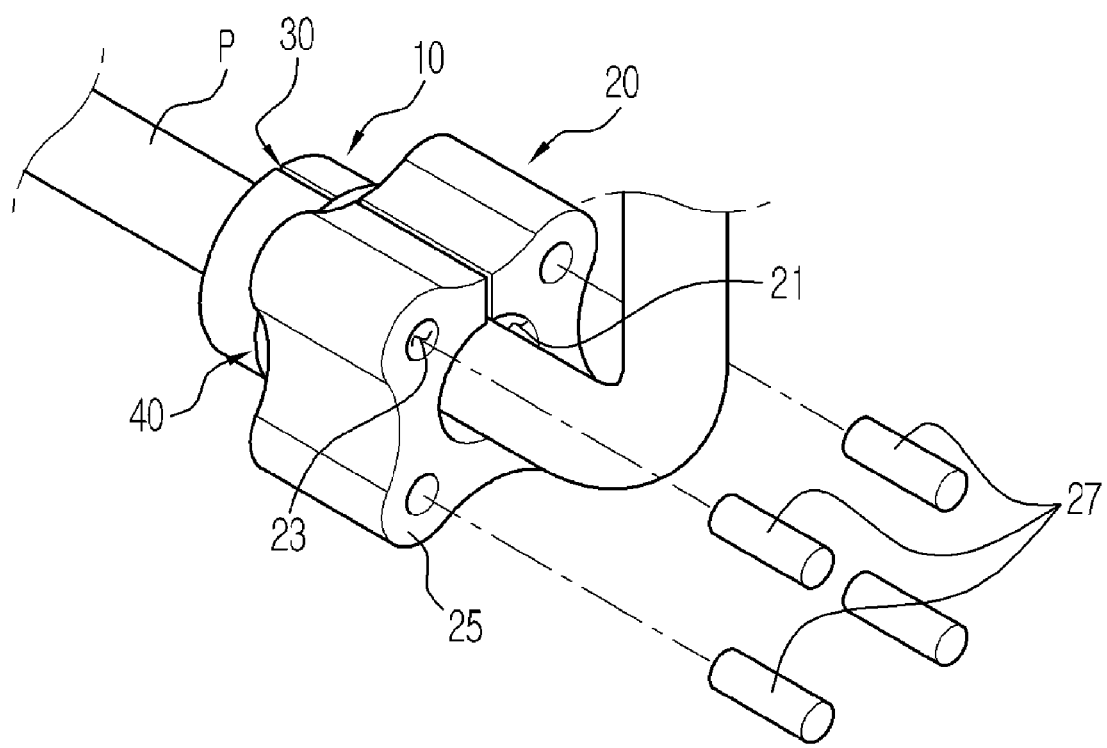
FIGS. 7 to 8 are drawings showing alternatives of a weight part of a damper for decreasing a piping vibration in accordance with one embodiment of the present disclosure.
Figure 8:
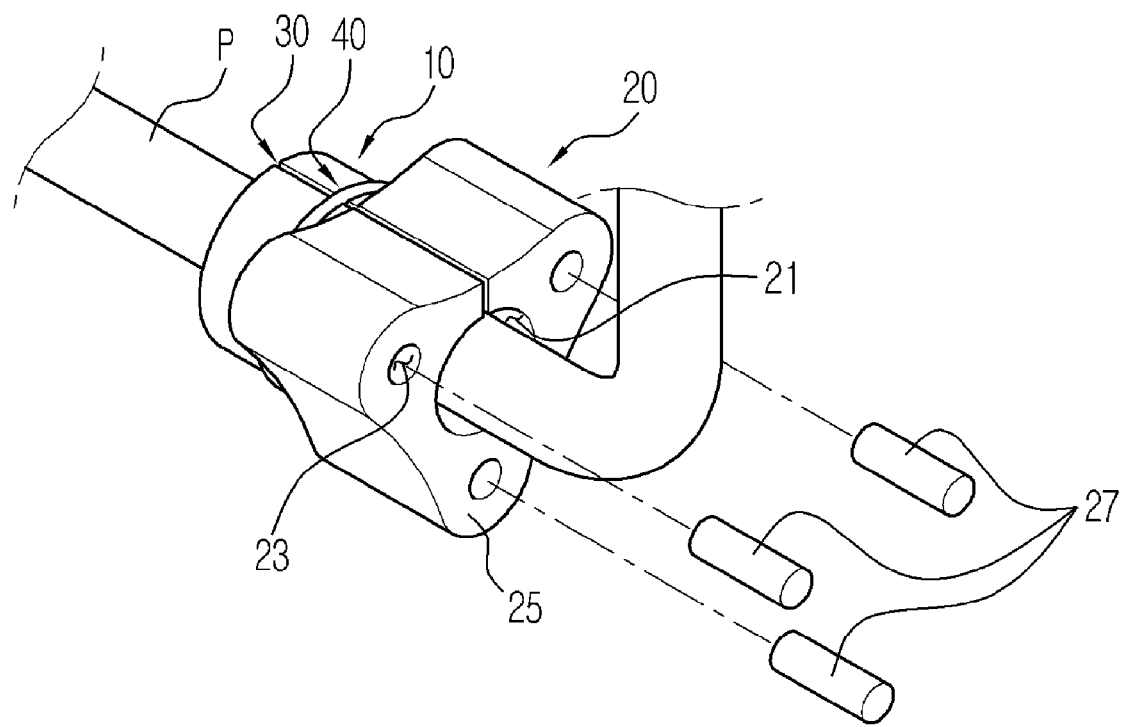

As illustrated on FIGS. 7 to 8, the weight part 20 may be formed in a way to have various shapes other than the cylindrical shape.

In a case when the weight part 20 is formed in a way to have a different shape other than the cylindrical shape, the weight part 20 includes a plurality of weight controlling portions 25 at which the insertion groove 23 is formed.

The weight controlling portions 25 may be provided in a predetermined number corresponding to the number of the insertion grooves 23 formed at the weight part 20.

In the drawings, it is illustrated that three or four portions of the weight controlling portions 25 are formed at the weight part 20, but according to the number of the insertion grooves 23 formed at the weight part 20, the weight controlling portions 25 may be formed in a way to be provided with various number of portions thereof.

The slitting part 30 is slit from one sides of the outer circumferential surface of the fixation part 10 and the weight part 20 to the coupling hole 11 and the penetrating hole 21 in lengthways of the fixation part 10 and the weight part 20.

The slitting part 30 is formed to install the damper for decreasing a piping vibration 1 at the pipe P, and after the slitting part 30 formed at the fixation part 10 and the weight part 20 is spread open, the damper for decreasing a piping vibration 1 is inserted around the pipe P through the slitting part 30, which is spread open, such that the damper for decreasing a piping vibration 1 is installed at the pipe P.

Although the damper for decreasing a piping vibration according to a few embodiments of the present disclosure has been described in relation to the shape and direction, it would be appreciated by those skilled in the art that changes may be made in these embodiments without departing from the principles and spirit of the disclosure, the scope of which is defined in the claims and their equivalents.

What is claimed is:

1. A damper for decreasing a piping vibration of a pipe, the damper comprising:
   a fixation part provided with a coupling hole formed therein to be coupled to the pipe, and coupled and fixed to the pipe such that the coupling hole makes contact with an outer circumferential surface of the pipe;
   a weight part connected to the fixation part, and provided at an inside thereof with a penetrating hole having a diameter larger than an outside diameter of the pipe formed thereto such that the pipe passes through the penetrating hole while the weight portion is spaced apart from the outer circumferential surface of the pipe; and
   a slitting portion formed in a slitting manner from one of the sides of the outer circumferential surfaces of the fixation part and the weight part to the coupling hole and the penetrating hole lengthways of the fixation part and the weight part,
   wherein a plurality of insertion grooves are formed in the weight part and spaced circumferentially in the weight part at an axial end face thereof, the plurality of insertion grooves being configured to removably receive one or more weight controlling members, whereby a weight of the weight part is increased by inserting one or more weight controlling members into the insertion grooves and the weight of the weight part is decreased by removing one or more of the weight controlling members from the insertion groove.

2. The damper of claim 1, wherein the fixation part includes material provided in a cylindrical shape and having elasticity.

3. The damper of claim 2, wherein a spring clip is coupled to the fixation part to fix the fixation part to the pipe.

4. The damper of claim 3, wherein the spring clip includes steel material having elasticity.

5. The damper of claim 4, wherein the spring clip is formed in a circular shape having one side thereof open, such that the spring clip is inserted around the fixation part to surround the outer circumferential surface of the fixation part, and thereby the fixation part is fixed to the pipe.

6. The damper of claim 5, wherein a coupling groove is formed along a circumference of the fixation portion at the outer circumferential surface of the fixation part such that the spring clip is coupled to the coupling groove.

7. The damper of claim 1, wherein the weight part includes material provided in a cylindrical shape and having elasticity.

* * * * *